US012557007B2

United States Patent
Lakshmipathi (10) Patent No.: US 12,557,007 B2
(45) Date of Patent: Feb. 17, 2026

(54) METHOD AND SYSTEMS FOR PERFORMING CELL SEARCH

(71) Applicant: Alif Semiconductor Singapore Private Ltd., Singapore (SG)

(72) Inventor: Sondur Lakshmipathi, Bangalore (IN)

(73) Assignee: Alif Semiconductor Singapore Private Ltd., Singapore (SG)

( * ) Notice: Subject to any disclaimer, the term of this patent is extended or adjusted under 35 U.S.C. 154(b) by 552 days.

(21) Appl. No.: 18/066,963

(22) Filed: Dec. 15, 2022

(65) Prior Publication Data

US 2023/0199625 A1 Jun. 22, 2023

Related U.S. Application Data

(60) Provisional application No. 63/265,507, filed on Dec. 16, 2021.

(51) Int. Cl.
*H04W 48/16* (2009.01)

(52) U.S. Cl.
CPC .................................. *H04W 48/16* (2013.01)

(58) Field of Classification Search
CPC ...................................................... H04W 48/16
USPC ........................................................... 370/328
See application file for complete search history.

(56) References Cited

U.S. PATENT DOCUMENTS

| | | | |
|---|---|---|---|
| 2011/0103534 A1* | 5/2011 | Axmon | H04L 27/2657 375/371 |
| 2019/0124522 A1* | 4/2019 | Cao | H04W 16/30 |
| 2023/0093947 A1* | 3/2023 | Qi | H04J 11/0093 370/350 |

* cited by examiner

*Primary Examiner* — Chuck Huynh
(74) *Attorney, Agent, or Firm* — Weaver Austin Villeneuve & Sampson LLP (57) ABSTRACT

Techniques for performing a cell search for the presence of multiple cells in a frequency band are described. Each frequency band is segmented into sub-bands, each sub-band covering more than one raster scan (e.g., 100 kHz). Each segment has a predetermined center frequency for RF tuning. The number of tunable RF center frequencies can be equal to the number of segments in a frequency band. The techniques include obtaining IQ signals in a digital domain at a predefined RF center frequency. Further, the techniques include computing a matched filtering of PSS sequence with IQ samples of sub-bands with a predefined and predetermined waveform through matched filtering, and averaging correlations for smoothing the peaks that exceed a predetermined threshold to detect or reject the presence of a cell.

17 Claims, 8 Drawing Sheets

100

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0 – 599 | 1920 | 18000 | 18000 – 18599 |
| 2 | 1930 | 600 | 600 – 1199 | 1850 | 18600 | 18600 – 19199 |
| 3 | 1805 | 1200 | 1200 – 1949 | 1710 | 19200 | 19200 – 19949 |
| 4 | 2110 | 1950 | 1950 – 2399 | 1710 | 19950 | 19950 – 20399 |
| 5 | 869 | 2400 | 2400 – 2649 | 824 | 20400 | 20400 – 20649 |
| 6 | 875 | 2650 | 2650 – 2749 | 830 | 20650 | 20650 – 20749 |
| 7 | 2620 | 2750 | 2750 – 3449 | 2500 | 20750 | 20750 – 21449 |
| 8 | 925 | 3450 | 3450 – 3799 | 880 | 21450 | 21450 – 21799 |
| 9 | 1844.9 | 3800 | 3800 – 4149 | 1749.9 | 21800 | 21800 – 22149 |
| 10 | 2110 | 4150 | 4150 – 4749 | 1710 | 22150 | 22150 – 22749 |
| 11 | 1475.9 | 4750 | 4750 – 4999 | 1427.9 | 22750 | 22750 – 22999 |
| 12 | 728 | 5000 | 5000 – 5179 | 698 | 23000 | 23000 – 23179 |
| 13 | 746 | 5180 | 5180 – 5279 | 777 | 23180 | 23180 – 23279 |
| 14 | 758 | 5280 | 5280 – 5379 | 788 | 23280 | 23280 – 23379 |
| ... | | | | | | |
| 17 | 734 | 5730 | 5730 – 5849 | 704 | 23730 | 23730 – 23849 |
| 18 | 860 | 5850 | 5850 – 5999 | 815 | 23850 | 23850 – 23999 |
| 19 | 875 | 6000 | 6000 – 6149 | 830 | 24000 | 24000 – 24149 |
| ... | | | | | | |
| 33 | 1900 | 36000 | 36000 – 36199 | 1900 | 36000 | 36000 – 36199 |
| 34 | 2010 | 36200 | 36200 – 36349 | 2010 | 36200 | 36200 – 36349 |
| 35 | 1850 | 36350 | 36350 – 36949 | 1850 | 36350 | 36350 – 36949 |
| 36 | 1930 | 36950 | 36950 – 37549 | 1930 | 36950 | 36950 – 37549 |
| 37 | 1910 | 37550 | 37550 – 37749 | 1910 | 37550 | 37550 – 37749 |
| 38 | 2570 | 37750 | 37750 – 38249 | 2570 | 37750 | 37750 – 38249 |
| 39 | 1880 | 38250 | 38250 – 38649 | 1880 | 38250 | 38250 – 38649 |
| 40 | 2300 | 38650 | 38650 – 39649 | 2300 | 38650 | 38650 – 39649 |

NOTE: The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

METHOD AND SYSTEMS FOR PERFORMING CELL SEARCH

CROSS-REFERENCE TO RELATED APPLICATIONS

This application claims the benefit of and priority to U.S. Provisional Application No. 63/265,507, filed Dec. 16, 2021, and titled "METHOD AND SYSTEMS FOR PERFORMING CELL SEARCH", which is incorporated herein by reference in its entirety for all purposes.

BACKGROUND

Third Generation Partnership Project (3GPP) standards provide various forms of radio access technologies (RATs) such as Long Term Evolution (LTE) and New Radio (NR), and resulting wireless communication configurations and protocols such as NarrowBand-Internet of Things (NB-IOT) and enhanced Machine Type Communication (eMTC). In NB-IOT and eMTC, the higher protocol layers can be configured to send an LTE frequency band of interest to lower layers, including the physical layer.

SUMMARY

This disclosure relates generally to 3rd Generation Partnership Project (3GPP)-based wireless communications. More specifically, disclosed herein are techniques for performing a cell search for the presence of multiple cells in a frequency band. Techniques disclosed herein may be used in 3GPP Long Term Evolution (LTE) and its associated variants, including Narrowband Internet of Thing (NB-IoT), Enhanced Machine Type of Communication (eMTC), 5G New Radio, and the like. Various inventive embodiments are described herein, including devices, systems, methods, processes, computer-readable storage media, and the like.

According to certain embodiments, a method may include obtaining an in-phase/quadrature (I/Q) sample sequence by sampling a center frequency of a radio frequency (RF) segment of an RF band to be searched for cells of a radio access network (RAN), wherein the RF segment is of a bandwidth greater than a channel raster for the RF band as defined by 3GPP or the Specification Standards, generating a correlation sequence for the RF segment, including performing matched filtering of the I/Q sample sequence with a primary synchronization signal (PSS) sequence, detecting a RAN cell based on a peak in the correlation sequence, and identifying an RF channel number associated with the RAN cell.

In some embodiments, the RF channel number can be an Evolved Universal Mobile Telecommunications System Terrestrial Radio Access Absolute Radio Frequency Channel Number (EARFCN). In some embodiments, the method can comprise detecting the RAN cell based on a determination that a value of the peak exceeds a threshold. In some embodiments, the method can comprise detecting multiple RAN cells based multiple respective peaks in the correlation sequence.

In some embodiments, the method can comprise sampling the center frequency of the RF segment over each of a series of time intervals to obtain a plurality of I/Q sample sequences including the I/Q sample sequence, generating a plurality of constituent correlation sequences, including performing matched filtering of the plurality of I/Q sample sequences with the PSS sequence, and generating the correlation sequence for the RF segment based on the plurality of constituent correlation sequences.

In some embodiments, the method can comprise generating the correlation sequence for the RF segment by averaging the plurality of constituent correlation sequences. In some embodiments, the method can comprise determining a physical cell identifier (PCID) of the RAN cell based on the I/Q sample sequence. In some embodiments, the method can comprise processing the I/Q sample sequence to detect a secondary synchronization signal (SSS) and determining the PCID of the RAN cell based on the SSS. In some embodiments, the method can comprise measuring, for the detected RAN cell, one or more of a reference signal received power (RSRP), a received signal strength indicator (RSSI), and a reference signal received quality (RSRQ).

According to certain embodiments, a device may include a wireless receiver, a memory, and one or more processing units communicatively coupled to the wireless receiver and the memory. The one or more processing units may be configured to perform operations including obtaining an in-phase/quadrature (I/Q) sample sequence by sampling a center frequency of a radio frequency (RF) segment of an RF band to be searched for cells of a radio access network (RAN), wherein the RF segment is of a bandwidth greater than a channel raster for the RF band, generating a correlation sequence for the RF segment, including performing matched filtering of the I/Q sample sequence with a primary synchronization signal (PSS) sequence, detecting a RAN cell based on a peak in the correlation sequence, and identifying an RF channel number associated with the RAN cell.

In some implementations, the one or more processing units can be configured to perform operations comprising detecting the RAN cell based on a determination that a value of the peak exceeds a threshold. In some implementations, the one or more processing units can be configured to perform operations comprising detecting multiple RAN cells based multiple respective peaks in the correlation sequence.

In some implementations, the one or more processing units can be configured to perform operations comprising sampling the center frequency of the RF segment over each of a series of time intervals to obtain a plurality of I/Q sample sequences including the I/Q sample sequence, generating a plurality of constituent correlation sequences, including performing matched filtering of the plurality of I/Q sample sequences with the PSS sequence, and generating the correlation sequence for the RF segment based on the plurality of constituent correlation sequences.

In some implementations, the one or more processing units can be configured to perform operations comprising generating the correlation sequence for the RF segment by averaging the plurality of constituent correlation sequences. In some implementations, the one or more processing units can be configured to perform operations comprising determining a physical cell identifier (PCID) of the RAN cell based on the I/Q sample sequence. In some implementations, the one or more processing units can be configured to perform operations comprising processing the I/Q sample sequence to detect a secondary synchronization signal (SSS) and determining the PCID of the RAN cell based on the SSS. In some implementations, the one or more processing units can be configured to perform operations comprising measuring, for the detected RAN cell, one or more of a reference signal received power (RSRP), a received signal strength indicator (RSSI), and a reference signal received quality (RSRQ).

According to certain embodiments, a non-transitory computer-readable medium may have instructions embedded thereon, the instructions, when executed by one or more processing units, may cause the one or more processing units to perform operations comprising obtaining an in-phase/quadrature (I/Q) sample sequence by sampling a center frequency of a radio frequency (RF) segment of an RF band to be searched for cells of a radio access network (RAN), wherein the RF segment is of a bandwidth greater than a channel raster for the RF band, generating a correlation sequence for the RF segment, including performing matched filtering of the I/Q sample sequence with a primary synchronization signal (PSS) sequence, detecting a RAN cell based on a peak in the correlation sequence, and identifying an RF channel number associated with the RAN cell.

In some embodiments, the instructions, when executed by the one or more processing units, can cause the one or more processing units to perform operations comprising detecting the RAN cell based on a determination that a value of the peak exceeds a threshold. In some embodiments, the instructions, when executed by the one or more processing units, can cause the one or more processing units to perform operations comprising detecting multiple RAN cells based multiple respective peaks in the correlation sequence.

In some embodiments, the instructions, when executed by the one or more processing units, can cause the one or more processing units to perform operations comprising sampling the center frequency of the RF segment over each of a series of time intervals to obtain a plurality of I/Q sample sequences including the I/Q sample sequence, generating a plurality of constituent correlation sequences, including performing matched filtering of the plurality of I/Q sample sequences with the PSS sequence, and generating the correlation sequence for the RF segment based on the plurality of constituent correlation sequences.

In some embodiments, the instructions, when executed by the one or more processing units, can cause the one or more processing units to perform operations comprising generating the correlation sequence for the RF segment by averaging the plurality of constituent correlation sequences. In some embodiments, the instructions, when executed by the one or more processing units, can cause the one or more processing units to perform operations comprising determining a physical cell identifier (PCID) of the RAN cell based on the I/Q sample sequence. In some embodiments, the instructions, when executed by the one or more processing units, can cause the one or more processing units to perform operations comprising processing the I/Q sample sequence to detect a secondary synchronization signal (SSS) and determining the PCID of the RAN cell based on the SSS. In some embodiments, the instructions, when executed by the one or more processing units, can cause the one or more processing units to perform operations comprising measuring, for the detected RAN cell, one or more of a reference signal received power (RSRP), a received signal strength indicator (RSSI), and a reference signal received quality (RSRQ).

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Various embodiments in accordance with the present disclosure will be described with reference to the drawings, in which:

FIG. 1 illustrates a table indicating the relationship among downlink frequencies, EARFCNs, and the RF tuning range in various EUTRA bands.

DETAILED DESCRIPTION

The present disclosure relates generally to 3rd Generation Partnership Project (3GPP)-based wireless communications. More specifically, disclosed herein are techniques for performing a cell search for the presence of multiple cells in a frequency band. Techniques disclosed herein may be used in 3GPP Long Term Evolution (LTE) and its associated variants, including Narrowband Internet of Thing (NB-IoT), Enhanced Machine Type of Communication (eMTC), 5G New Radio, and the like. Various inventive embodiments are described herein, including devices, systems, methods, processes, computer-readable storage media, and the like.

As used herein, a "base station" or an "access point" may include a node B, an Evolved Node B (eNodeB or eNB), a base transceiver station (BTS), a radio base station (RBS), an NR NodeB (gNB), a Next Generation eNB (ng-eNB), or the like.

As used herein, a "cell" may generically refer to a logical communication entity used for communication with a base station (e.g., over some frequency resource referred to as a carrier frequency, component carrier (aggregated carrier with an increased bandwidth of, for example, 1.4, 3, 5, 10, 15, 20 MHz or higher), carrier, band, or the like), and may be associated with an identifier (e.g., a physical cell identifier (PCID), a virtual cell identifier (VCID), or a cell global identifier (CGID)) for distinguishing neighbor cells operating via the same or a different carrier frequency. In some examples, a carrier may support multiple cells, and different cells may be configured according to different protocol types (e.g., machine-type communication (MTC), NB-IoT, or enhanced mobile broadband (eMBB)) that may provide access for different types of devices. In some cases, the term "cell" may refer to a portion of a geographic coverage area (e.g., a sector) over which the logical entity operates.

As used herein, a User Equipment (UE) may include and/or may be referred to as a device, a mobile device, a wireless device, a mobile terminal, a terminal, a mobile station (MS), a secure user plane location (SUPL)-enabled terminal (SET), or by another name. Moreover, a UE may correspond to a cellphone, smartphone, laptop, tablet, personal data assistant (PDA), Internet of things (IoT) device, or some other portable or moveable device. A UE may support wireless communications using one or more RATs, such as using global system for mobile communications (GSM), code division multiple access (CDMA), wideband CDMA (WCDMA), long-term evolution (LTE), high rate packet data (HRPD), IEEE 802.11 Wi-Fi, Bluetooth, worldwide interoperability for microwave access (WiMAX), 5G NR, NB-IoT, and the like. A UE may also support wireless communication using a WLAN which may connect to other networks, such as the Internet.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

According to 3GPP Technical Specification (TS) 36.101, there are Frequency Division Duplex (FDD) and Time Division Duplex (TDD) Evolved Universal Mobile Telecommunications System Terrestrial Radio Access (EUTRA) bands with different carrier frequencies with frequency ranges (Range of NDL) and bandwidths for uplink (UL) and downlink (DL) communications. In LTE communications, the carrier frequency in the uplink and downlink is designated by EUTRA Absolute Radio Frequency Channel Numbers (EARFCNs) ranging, for example, between 0 and 65535. The Range of NDL may also be referred to as the range of EARFCN.

For a given EUTRA band, the bandwidth between the range of downlink carrier frequencies (FDL) between FDL_low and FDL_high can be scanned by user equipment (UE) in power-on mode. The UE may scan from FDL_low to FDL_high in steps of, e.g., 100 kHz, to detect the presence of a Physical Cell Identifier (PCID). Such incremental scanning may be referred to as raster scanning. Within each supported EUTRA band, a UE may detect the presence of a PCID on a given 100 kHz grid of the EUTRA band. The higher layers may send a cell detection request (e.g., for a EUTRA band number) to a PHY controller, which provides control signals to the RF front end (RFE). The control signals may be provided through, e.g., a RF application programming interface (RF API) to begin a neighboring cellular network search from FDL low to FDL high. A receiver of the UE may receive in-phase quadrature (IQ) samples at a desired sampling rate (Fs) and initiate the cell searcher for cell acquisition along with measurement parameters. Upon completion of the search for a valid cell (PCID) by the cell searcher, cell parameters can be stored and uploaded to higher layers. The stored parameters corresponding to the detected cell may include PCIDs, Master Information Blocks (MIBs), System Information Blocks (SIBs), and/or physical measurements such as Reference Signal Received Power (RSRP), Received Signal Strength Indicator (RSSI), and/or Reference Signal Received Quality (RSRQ).

Upon detection (or no detection) of the cell by the cell searcher, the PHY controller may trigger the RFE through a RF API for tuning the RF to the next frequency (FDL low+100 kHz). The process may repeat for every increment of the 100 kHz raster frequency until a specific target band, selected bands, or all the EUTRA bands are searched within a range of NDL. The higher layers may prepare the list of detected cells and corresponding cell parameters, and select the cell, e.g., with the highest RSRP or RSRQ. The higher layers may indicate to the physical layer which detected cell the UE should use, e.g., based on the highest detected RSRQ. The RFE may then tune to the UL and the DL frequencies of the EARFCN of the EUTRA band for camping.

RFE can tune to frequency ranges starting from FDL_low and ending at FDL_high in steps of 100 kHz raster frequency increments. In one example, for EUTRA operating band 1 between FDL_low=2110 MHz and FDL_high=2170 MHz as shown in FIG. 1, the range of NDL is 0-599, and the number of times the RFE tunes for all the raster frequencies is 600 times to cover a range of NDL=60 MHz.

This tuning procedure results in a significant increase of interactions between a baseband (e.g., an L1 Controller) and the RFE. Moreover, in the presence of noise, the detection of PCIDs may be reduced, and result in false positive detections.

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

An object of some embodiments disclosed herein is to provide techniques for performing a multiple Physical Cell Identifier (PCID) cell search in reduced time by segmenting the entire EUTRA band into sub-band segments in a single scan, where each sub-band consists of multiple EUTRA Absolute Radio Frequency Channel Numbers (EARFCNs).

An object of some embodiments disclosed herein is to provide a mechanism for obtaining quadrature (IQ) signals in the digital domain at predefined frequencies.

An object of some embodiments disclosed herein is to provide a mechanism for determining an Inverse Fast Fourier Transform (IFFT) of a predefined size of the IQ signals at a predetermined center frequency.

An object of some embodiments disclosed herein is to provide a mechanism for reducing the effect of noise of the sub-band segment using predetermined durations of IQ signals, where the durations are not limited to 5 milliseconds (ms) or 10 ms or multiples thereof.

An object of some embodiments disclosed herein is to provide a mechanism for repeatedly performing the averaging of IQ time-sample windows of 5 ms or 10 ms or multiples thereof, followed by time-shifted correlations through matched filtering of known sequences, e.g., primary synchronization signal (PSS), or superpositioning all 3 sectors (sector ID) of sequences in time domain superposition.

An object of some embodiments disclosed herein is to check and select the peaks which exceed a threshold and correspond to the EARFCNs within each sub-band segment, and then perform cell-search signal processing for determining the PCIDs.

An object of some embodiments disclosed herein is to enable performance of correlations in time domain and in frequency domain matched filtering.

An object of some embodiments disclosed herein is to provide a mechanism for shortlisting detected PCIDs for RF carriers, along with information on Received Signal Strength Indicator (RSSI), Reference Signal Received Power (RSRP), and EARFCN.

An object of some embodiments disclosed herein is to provide a mechanism for selecting an LTE cell associated with highest Reference Signal Received Quality (RSRQ) among plurality of RSRQs of identified cells corresponding to the multiple PCIDs.

The description provided herein is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IOT) network, such as a system utilizing 3G, 4G, 5G, 6G, or further implementations thereof, technology.

Figure 2:
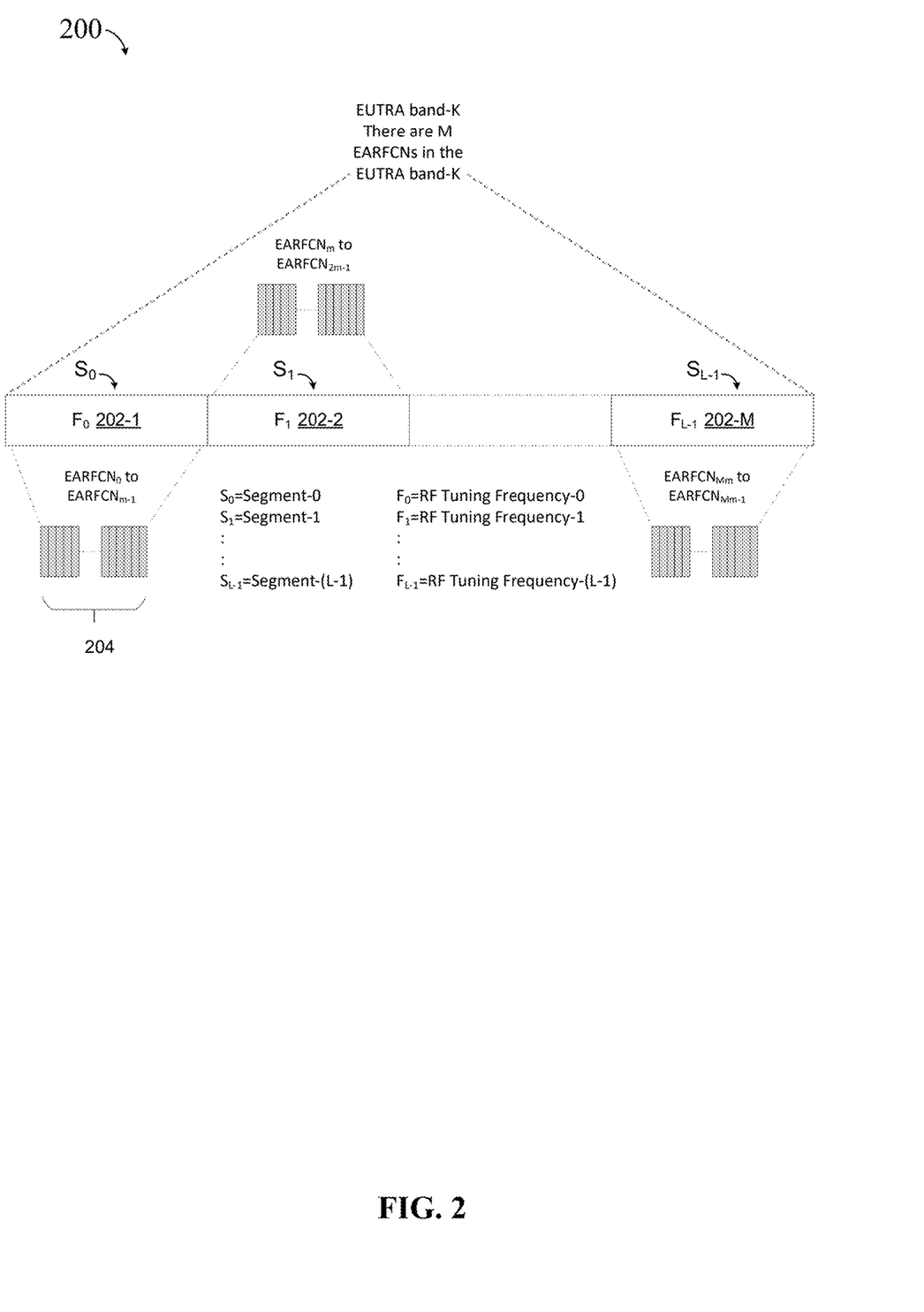
FIG. 2 illustrates a block diagram depicting segmentation of an EUTRA band into sub band segments.

FIG. 2 illustrates segmentation of an EUTRA band 200 into sub-band segments 202-1, 202-2, 202-M. EUTRA band 200 may include a total of M number of EARFCNs across multiple sub-band segments. Each sub-band segment may include m EARFCNs 204 separated by a 100 kHz raster grid. For example, sub-band 202-1 may include EARFCN 0 through EARFCN m−1 for a total of m EARFCNs, each EARFCN corresponding to a 100 KHz frequency band. Similarly, sub-band 202-M may include EARFCN Mm through EARFCN Mm−1 for another m EARFCNs. Each sub-band segment may have a predetermined RF center frequency.

In 3GPP systems (e.g., LTE), two downlink synchronization signals used by the UE to obtain the cell identity and frame timing are the primary synchronization signal (PSS) and the secondary synchronization signal (SSS). The PSS is associated with the cell identity, called as Sector ID, whereas SSS is defined to identify the Group ID, both Sector ID and Group ID summation gives the Cell Identity Number or PCID (physical cell identity).

An ideal PSS for 3GPP implementations such as eMTC or NPSS, in NB-IOT, may be generated from the frequency domain. The time domain of the PSS sequences may be obtained by taking the Inverse Fast Fourier Transform (IFFT) of the frequency domain PSS signal, for an IFFT length according to the sampling rate of IQ signals received from an analog-to-digital converter (ADC). For example, in case of LTE, the IFFT length can be dependent upon the bandwidth of the LTE transmission bandwidth. However, whereas in case of, e.g., eMTC or NB-IOT, for the sampling rate Fs=1.92 MHz the IFFT length may be 128. In case of higher or lower sampling rates Fs the IFFT length is taken corresponding to the Fs. In the case of, e.g., eMTC or NB-IOT, a superposition of three PSS sequences in the time domain may result in a summed-up sequence length of 128x1 representing all three PSS sequences.

In some 3GPP implementations, such as LTE, eMTC, and 5G NR, the ideal PSS corresponds to three sector IDs (0,1,2). All three sequences in the time domain can be superpositioned to a single time sequence. The superposition can be expressed as $x=x0+x1+x2$, where x0, x1, and x2 correspond to a PSS time domain sequence for sector 0, sector 1, and sector 2, respectively. In some 3GPP implementations, such as NB-IOT, the ideal PSS corresponds to the Narrow Band Primary Synchronization Signal (NPSS) sequence in the time domain.

Figure 3:
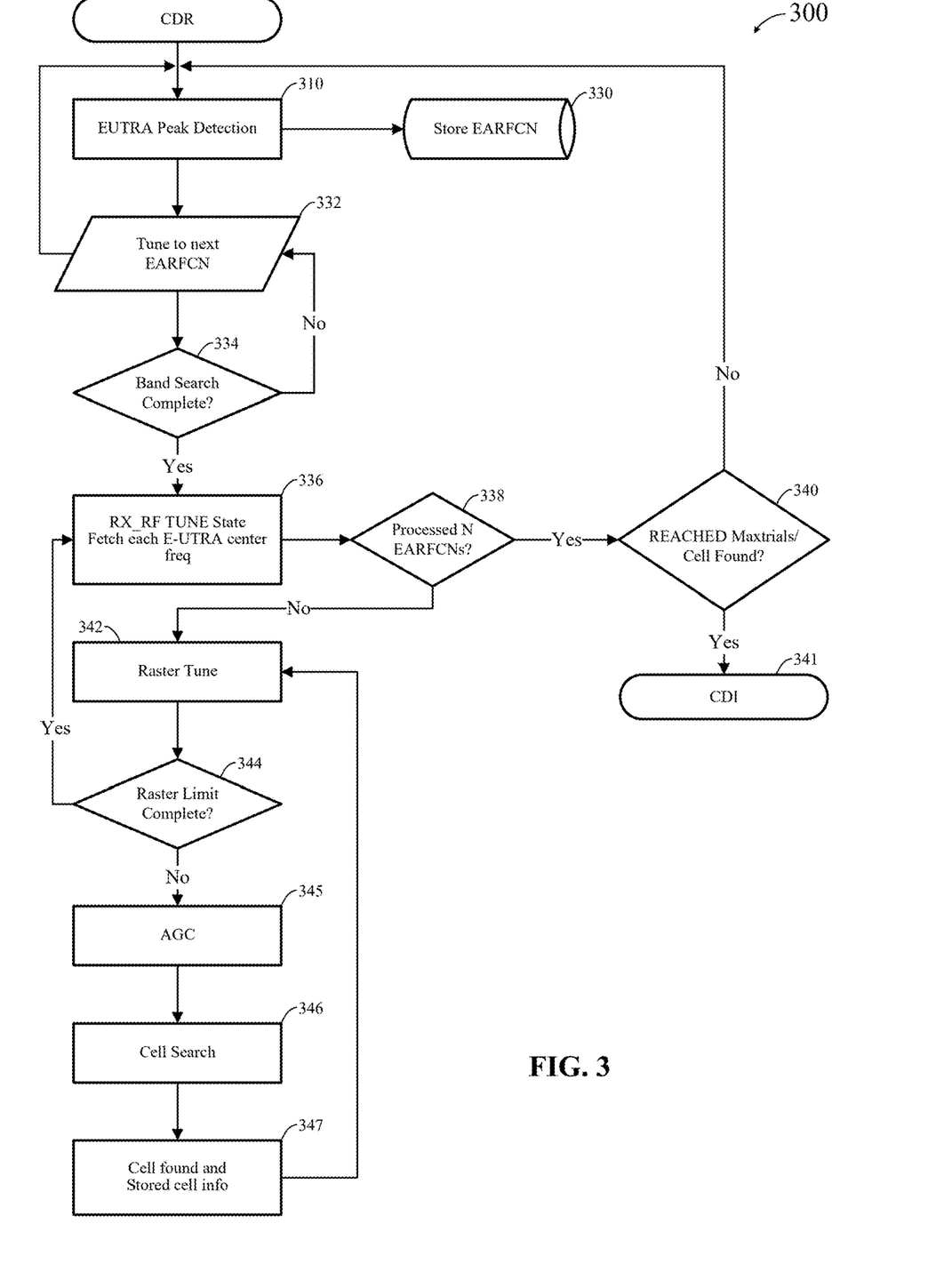
FIG. 3 illustrates a flow diagram of an example of a process for performing a cell search with exhaustive EUTRA band search in selective sub-bands by matched filtering, followed by detecting the cells PCIDs.
Figure 5:
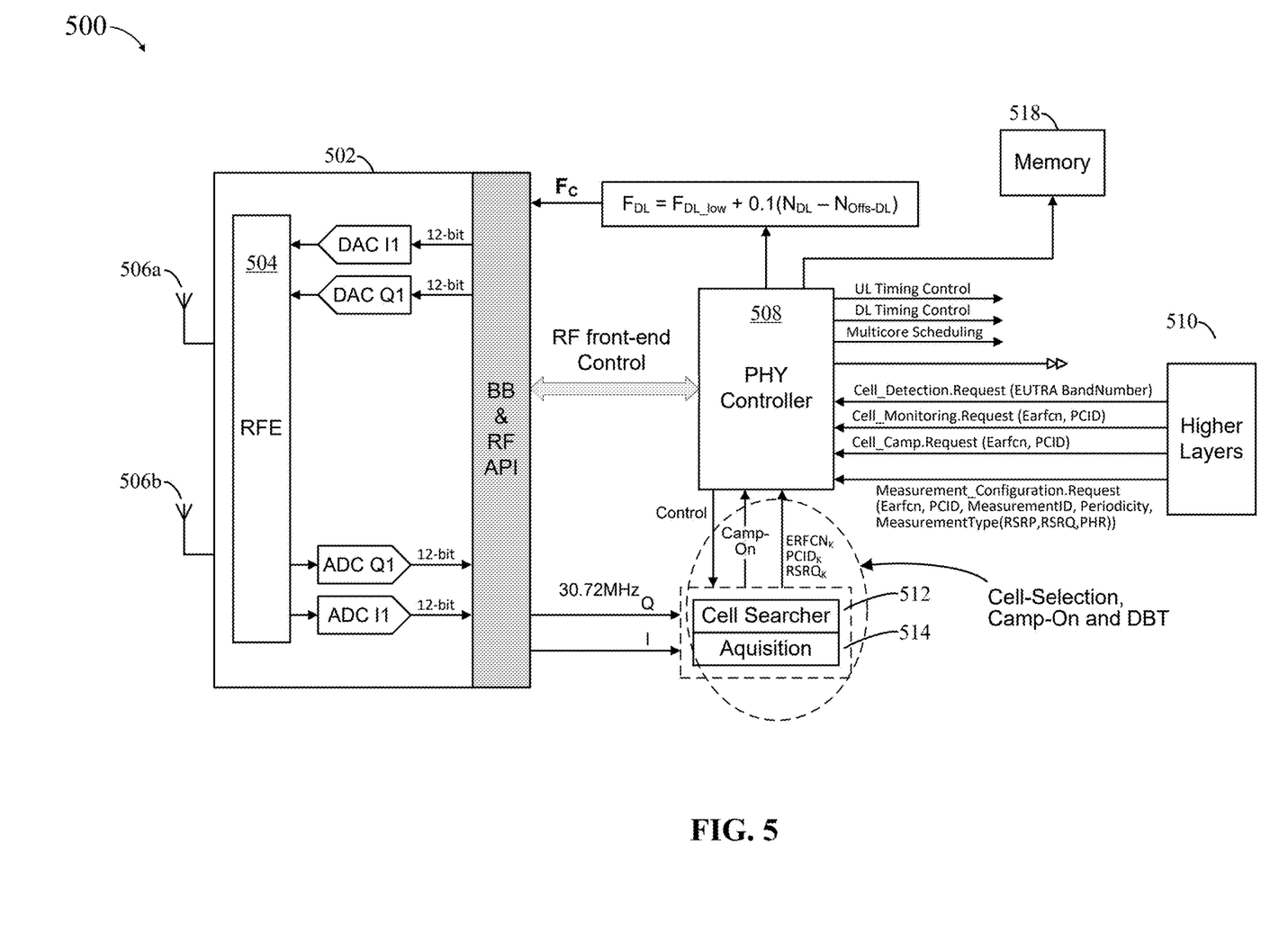
FIG. 5 illustrates a block diagram of an example of a RF subsystem including a baseband interface.

FIG. 3 is a flow diagram of a process 300 for performing a cell search, in accordance with some embodiments. Process 300 can be embodied as code or instructions stored on a computer-readable medium executable by a data processor or a controller (e.g., of the RF subsystem, the UE, etc.). It should be noted that the operations of the process 300 may be performed in any suitable order, and not necessarily the order depicted in FIG. 3. Further, process 300 may include additional or fewer operations than those depicted in FIG. 3. In some embodiments, the functionality illustrated in one or more of the steps shown in FIG. 3 may be performed by hardware and/or software components of a suitable system or apparatus (e.g., a RF subsystem) configured to operate the various components and modules implementing the architecture of FIG. 5. Example, components of the apparatus illustrated in FIG. 5 are described in more detail below.

Method 310 may begin with a cell detection request (CDR). At step 310, detection of correlation peak for an EARFCN is performed. At step 330, peak detection information for the EARFCN is stored in a memory apparatus. For example, EARFCNs having peak correlation above a certain threshold can be stored for subsequent processing. The memory apparatus may be an example of memory 518 as described with respect to FIG. 5. At step 332, the subsystem is tuned to the next EARFCN for processing, and process 300 returns to step 310 to perform peak detection for the next EARFCN.

At step 334, a determination is made if the band search is complete. If there are any additional EARFCN to process, process 300 can continue back to step 332 to tune the subsystem to the next EARFCN. If the band search is complete, process 300 proceeds to step 336. At step 336, the RF subsystem may tune to center frequencies of each identified EARFCN for sub-bands of an EUTRA band.

At step 338, the RF subsystem may determine whether N number of EARFCNs have been processed. If so, at step 340, the RF subsystem may determine whether the cell search has succeeded in finding a cell. If a cell is found, process 300 can end at step 341. If not, process 300 may return to step 310. If the RF subsystem has determined that not all of the EARFCNs have been processed, the RF subsystem may perform a raster scan at step 342. A determination is made at step 344 if the raster limit is complete. If the raster limit is complete, process 300 can return to step 336. If not, process 300 continues to step 345 to apply automatic gain control. A cell search may then be performed at step 346. If a cell is found, the cell information is stored at step 347. Process 300 then returns to step 342 to continue the raster scan until the raster limit is complete.

Figure 4:
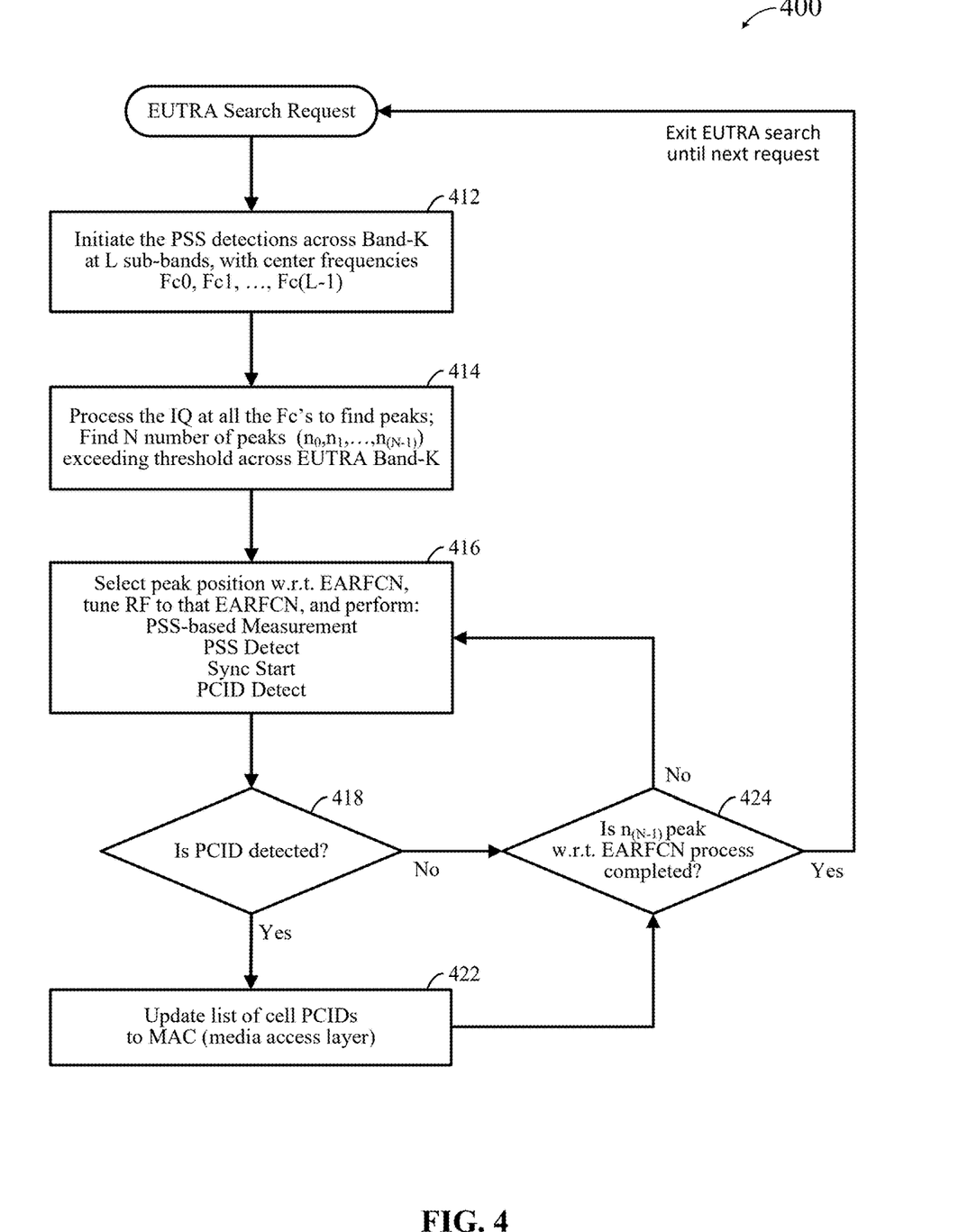
FIG. 4 illustrates a flow diagram of an example of a process for detection of correlation peaks which exceed a predetermined threshold for further processing to determine the PCID.

FIG. 4 illustrates a process 400 for processing correlation peaks exceeding a predetermined threshold to determine PCID. Process 400 may begin with an EUTRA search request. At step 412, PSS detections are initiated across EUTRA band-K at L sub-bands with center frequencies Fc0, Fc1, . . . , Fc(L−1). At step 414, IQ samples are processed at all center frequencies to find correlation peaks. Step 414 may find N number of peaks $n_0, n_1, \ldots, n_{(N-1)}$ exceeding a predetermined threshold across the EUTRA band-K. At step 416, a peak position with respect to an EARFCN is selected. The RF is tuned to the selected peak position. A PSS-based measurement, detection, synchronization, and PCID detection are performed for the selected peak position. At step 418, a determination is made as to whether a PCID is detected for the selected peak position. If a PCID is detected, the list of cell PCIDs is updated with the detected PCID to the media access layer. If a PCID is not detected at the peak position, then at block 424, a determination is made as to whether there are additional peak positions to process. If there is an additional peak position to process, process 400 returns to step 416 to select another peak position. If all peak positions have been processed, process 400 exits the EUTRA search until the next search request.

An example of a cell search process will now be described. A threshold Th may be selected for correlation of a matched filtering output to determine if the cell (PCID) is present or not present. Consider an entire EUTRA band-K (spanning K sub-bands), which consists of M EARFCNs in the downlink. Here, M raster scans may be performed, where each raster scan is 100 kHz wide, as illustrated in FIG. 2.

For example, band 1 spans bandwidth of 60 MHz, occupying a frequency range of 2110 MHz to 2170 MHz with EARFCN numbering 0 to 599 (see 3GPP TS 36.101). Examples of center frequencies for EUTRA band 1 are noted in Table 1:

knowledge of PCIDs present in any part of the EUTRA band-K.

The RF from F0 for sub-band 0 may be tuned. Matched filtering of the received IQ sequence with the superpositioned PSS sequence may be performed. The correlation peaks that exceed the predetermined threshold Th may be identified. The above identification process with respect to threshold Th can be performed for each sub-band from sub-band 1 to sub-band L−1. Each of the sub-bands can be tuned to the corresponding center frequency (F0, F1, . . . , FL−1) to identify the correlation peaks.

The acquisition of IQ time samples may be given a window of 5 ms (half of the System Frame Number (SFN) length) or 10 ms (full SFN length) within which PSS is present at least once. Consider the acquisition of half of SFN length of IQ samples, where half SFN length is equal to 5 System Frames (SFs), or 5 ms within which PSS is broadcast. Each SF would correspond to a duration of 1 ms. The start of the 5 ms IQ data may be random and unknown. If acquisition is done for multiple half SFNs, then summing and averaging of the time sequences of half SFNs or SFNs multiple times, for example, 10 times, may result in smoothing of IQ signal devoid ofor reduced noise and retaining the deterministic PSS in the sequence. PSS correlation in the time domain (matched filtering of ADC IQ samples with ideal superpositioned time domain signal of PSS) can be performed. During acquisition of IQ samples, the RF gain may be adapted according to the AGC feedback.

In some embodiments, correlation of the time sequence may be found. Given R−0, repeat the correlation sequence RI for next SFN length of IQ data, repeat until the desired k averaging requirements, then add the correlation sequences R0, R1, . . . , Rk as R=R0+R1+ . . . +Rk to average out the noise. The L peaks from the K sub-bands which exceed the threshold Th may be selected. The L peaks from EUTRA band-K represent the PSS detections at the corresponding EARFCNs. The IQ samples at the detected EARFCNs may be passed and the cell detection request may be triggered. The cell detection request may include detection of PCID for detection of SSS in the case of certain 3GPP implementations (such as LTE, 5G NR, and eMTC), or

TABLE 1

Example of EUTRA Band 1 with sub-band segments for raster scan

| | Downlink Frequencies and EARFCNs | | | | RF tuning (MHz) sequentially in sub-band segments Sub-band Segments | | | | |
|---|---|---|---|---|---|---|---|---|---|
| EUTRA Band | $F_{DL\_low}$-$F_{DL\_high}$ (MHz) | BW (MHz) | $N_{Offs\text{-}DL}$ | Range of $N_{DL}$ | Center Freq. $FC_0$ (MHz) | Center Freq. $FC_1$ | Center Freq. $FC_2$ | Center Freq. $FC_k$ | Center Freq. $FC_{39}$ |
| 1 | 2110-2170 | 60 | 0 | 0-599 | 2110.75 | 2112.25 | 2113.75 | . . . | 2169.25 |

Therefore, M=600. The entire band may be segmented into L equal sub-bands. For example, 60 MHz may be divided into 40 sub-bands where sub band 0 is from EARFCN 0 to EARFCN 14, sub-band 1 is from EARFCN 15 to EARFCN 29, and so on, until sub-band 39. The RF may be tuned to the center EARFCN of a given sub-band, where entire band 1 may range from 0 to L−1. IQ time samples may be acquired from the ADC. The UE has no NSSS in the case of some 3GPP implementations (such as NB-IOT). The cell detection request may also involve a cell search process per step 346.

Subsequent to detection of PCIDs, RSRP, RSSI and/or RSRQ measurements may be obtained for each PCID. The detected PCIDs may be passed onto the higher layers of the RF subsystem. MIB and SIB information may also be extracted for each cell and passed onto the higher layers.

FIG. 5 illustrates an example of an RF subsystem 500 and baseband interface 502. The RF subsystem 500 can be configured for selecting the center frequencies of sub-bands sequentially with feedback. In some embodiments, the baseband interface 502 may include an RF front end (RFE) 504. The RFE may include one or more antennas 506a, 506b.

In some embodiments, the RFE may be communicatively coupled to a PHY controller 508 and configured for data communication with other portions of the RF subsystem 500 via at least the PHY controller. One such portion may include higher protocol layers 510, with which cell detection requests, cell monitoring requests, measurement of RSRP, RSSI, RSRQ (and/or other types of physical measurements), configuration data, and other types of information may be exchanged.

In some embodiments, the RF subsystem 500 may include a cell searcher 512 and IQ acquisition module 514. The cell searcher 512 may be configured to search for and detect a valid cell (PCID) as described with respect to FIG. 3. The IQ acquisition module 514 may be configured to acquire, e.g., IQ time samples as described with respect to FIG. 3.

In some embodiments, the RF subsystem 500 may include a memory 518, which can be implemented as a computer-readable medium (e.g., non-transitory storage medium) or a combination of computer-readable media. Examples of computer-readable media include semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media may include non-volatile memory, volatile memory, or a combination thereof. In some embodiments, memory 418 may also include one or more hardware devices such as a solid-state memory, or the like. In some embodiments, memory 418 may store one or more computer program products that are each implemented as a set of instructions (e.g., program code) stored on a computer-readable medium. Such instructions may be executed, for example, by PHY controller 508.

Figure 6:
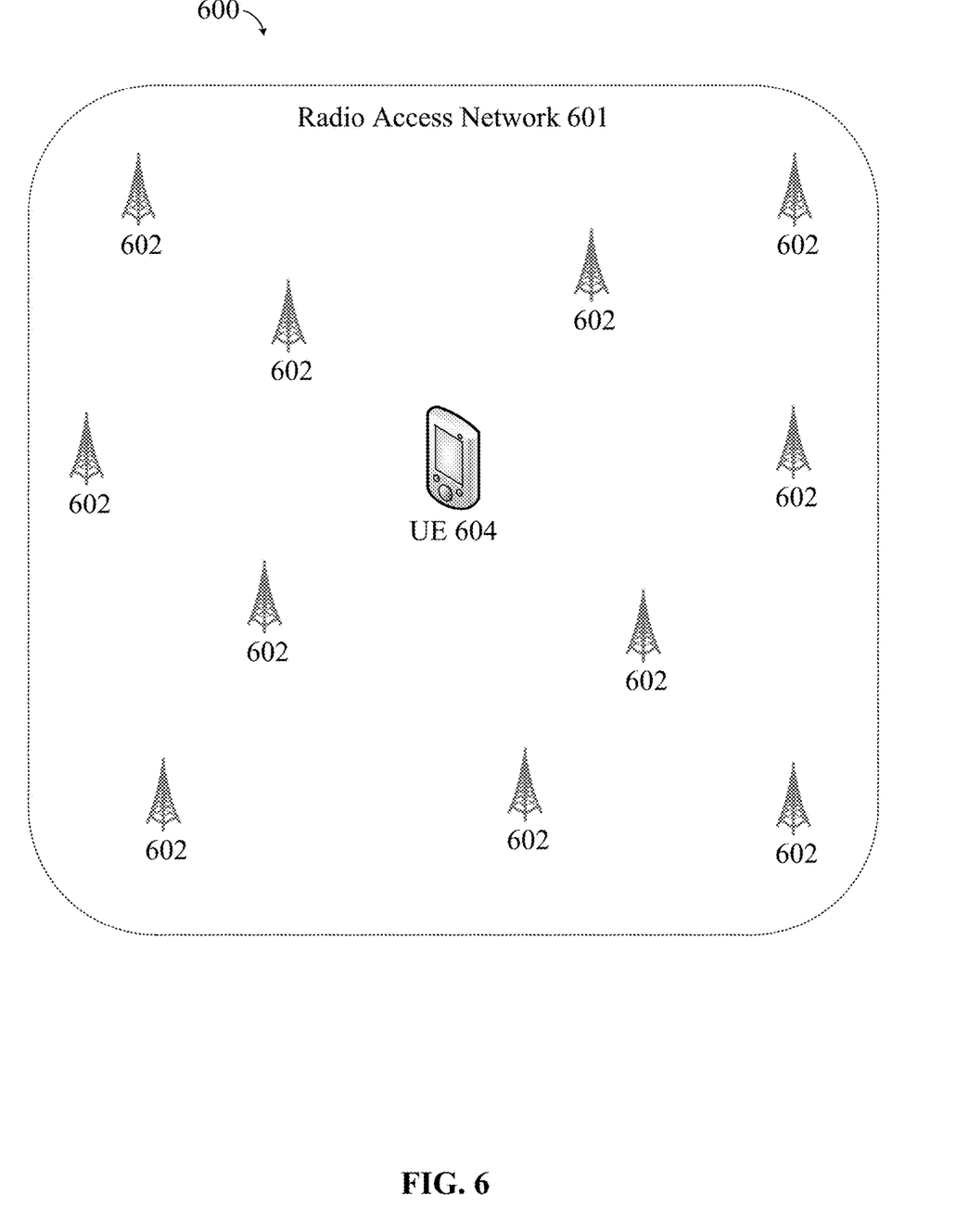
FIG. 6 illustrates a block diagram of an example operating environment.

FIG. 6 illustrates an example of an operating environment 600. In operating environment 600, a UE 604 operates in a RAN 601. RAN 601 can be a wireless network that implements 3GPP RAT(s), such as an LTE, 5G NR, NB-IOT, eMTC, and the like, and/or that implements one or more other radio access technologies. Various RAN nodes 602 in RAN 601 can serve RAN cells (not shown) of RAN 601. Depending on the nature of RAN 601, a given RAN node 602 can be, for example, an eNB, an ng-eNB, a gNB, an RBS, a BTS, or another type of node capable of serving cell(s) of a RAN such as RAN 601.

In order to allow devices in RAN 601 to discover the cells that they serve, various RAN nodes 602 in RAN 601 can transmit PSSs on various frequencies within an RF band used for wireless communications in RAN 601. In conjunction with operating in RAN 601, UE 604 can search for nearby cells by scanning the RF band for such PSSs. As discussed above, according to one approach, such scanning could be conducted by stepping through the frequencies within the RF band in increments equal to the raster frequency. However, as mentioned above, the burden imposed by the frequent baseband-RFE interactions associated with such a tuning procedure may be significant. Furthermore, noise effects may hinder PCID detections, and may induce false positive detections.

According to techniques disclosed herein, rather than stepping through the RF band according to the raster frequency, UE 604 can conduct cell search using an RF segment-based procedure. According to the RF segment-based procedure, the RF band can be divided into a plurality of RF segments. Each RF segment can be a respective frequency subrange within the overall frequency range of the RF band, and can comprise a respective subset of EARFCNs among the collective set of EARFCNs of the RF band. For instance, in an example implementation, the RF band can comprise a bandwidth of 60 MHz, over which 600 EARFCNs can be distributed according to a 100 kHz raster frequency. The RF band can be segmented into 40 RF segments having 1.5 MHz bandwidths, each of which comprises a respect subset of 15 EARFCNs among the 600 EARFCNs of the RF band. Rather than performing 600 tuning operations-one for each EARFCN-UE 604 can perform 40 tuning operations, each to a center frequency of a respective one of the 40 RF segments. UE 604 can search the RF segments for PSSs, obtain PCIDs of detected cells, and perform RSRP, RSSI, and/or RSRQ measurements according to techniques disclosed herein, such as those discussed above in reference to process 300 of FIG. 3 and process 400 of FIG. 4.

Figure 7:
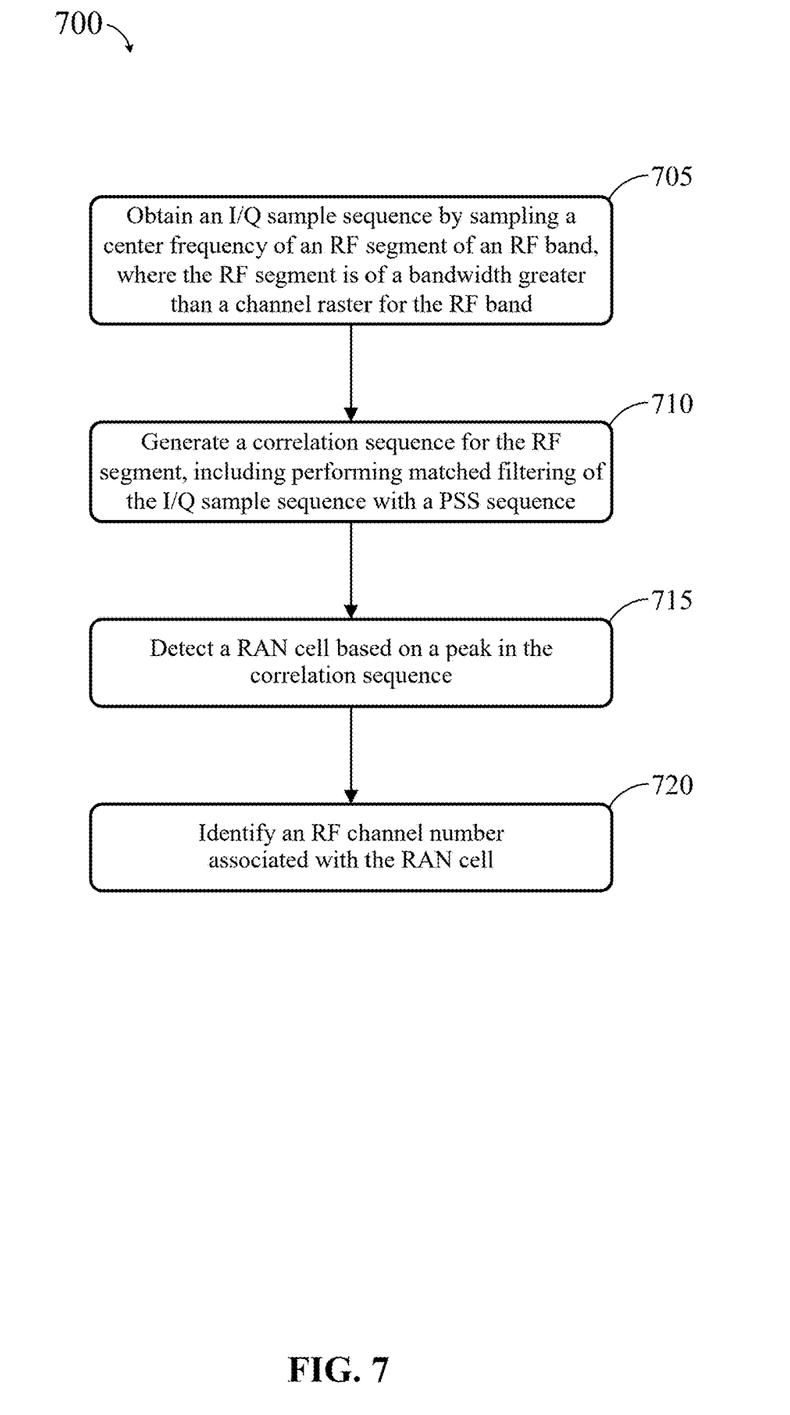
FIG. 7 includes a flowchart illustrating an example of a method for performing a cell search according to certain embodiments.

FIG. 7 includes a flowchart 700 illustrating an example of a method for performing a cell search according to certain embodiments. The operations described in flowchart 700 are for illustration purposes only and are not intended to be limiting. In various implementations, modifications may be made to flowchart 700 to add additional operations, to omit some operations, to combine some operations, to split some operations, or to change the order of the operations. In various implementations, UE 604 of FIG. 6 may perform operations of flowchart 700 in conjunction with conducting an RF-segment based cell search procedure in RAN 601.

At block 705, the operations may include obtaining an in-phase/quadrature (I/Q) sample sequence by sampling a center frequency of a radio frequency (RF) segment of an RF band to be searched for cells of a radio access network (RAN), where the RF segment is of a bandwidth greater than a channel raster for the RF band. For instance, in operating environment 600 of FIG. 6, UE 604 may obtain an I/Q sample sequence by sampling a center frequency of an RF segment of an RF band used in RAN 601, and the RF segment may be of a greater bandwidth than a channel raster for that RF band. In some implementations, the channel raster for the RF band can be 100 kHz, and the bandwidth of the RF segment can be a positive integer multiple of 100 kHz. In some implementations, for example, the RF segment can comprise 15 EARFCNs, and the bandwidth of the RF segment can thus be 15×100 kHz, or 1.5 MHz.

At block 710, the operations may include generating a correlation sequence for the RF segment, including performing matched filtering of the I/Q sample sequence with a PSS sequence. For example, after obtaining an I/Q sample sequence by sampling a center frequency of an RF segment in operating environment 600 of FIG. 6, UE 604 may generate a correlation sequence for the RF segment, including performing matched filtering of the I/Q sample sequence with a PSS sequence. The matched filtering of the I/Q sample sequence with the PSS sequence at block 710 can be conducted according to the techniques discussed above in reference to process 400 of FIG. 4.

In some implementations, the center frequency of the RF segment can be sampled over each of a series of time intervals to obtain a plurality of I/Q sample sequences. In some implementations, a plurality of constituent correlation sequences can be generated, including performing matched filtering of the plurality of I/Q sample sequences with the PSS sequence. In some implementations, the correlation sequence for the RF segment can be generated based on the plurality of constituent correlation sequences. In some implementations, the correlation sequence for the RF segment can be generated by averaging the plurality of constituent correlation sequences.

At block 715, the operations may include detecting a RAN cell based on a peak in the correlation sequence. For example, in operating environment 600 of FIG. 6, UE 604 may detect a RAN cell of RAN 601 based on a peak in a correlation sequence generated at block 710. The detection of the RAN cell at block 715 based on the peak in the correlation sequence can be conducted according to the techniques discussed above in reference to process 400 of FIG. 4. In some implementations, the RAN cell can be detected at block 715 based on a determination that a value of the peak exceeds a threshold. In some implementations, multiple RAN cells can be detected based on multiple respective peaks in the correlation sequence.

At block 720, the operations may include identifying an RF channel number associated with the RAN cell. For example, in operating environment 600 of FIG. 6, UE 604 may identify an RF channel number associated with a RAN cell of RAN 601 that has been detected at block 715. In some implementations, the RF channel number can be an Evolved Universal Mobile Telecommunications System Terrestrial Radio Access Absolute Radio Frequency Channel Number (EARFCN).

In some implementations, a physical cell identifier (PCID) of the detected RAN cell can be determined based on the I/Q sample sequence. In some implementations, for example, the I/Q sample sequence can be processed to detect a secondary synchronization signal (SSS), and the PCID of the detected RAN cell can be determined based on the SSS. In some implementations, one or more of a reference signal received power (RSRP), a received signal strength indicator (RSSI), and a reference signal received quality (RSRQ) can be measured for the detected RAN cell.

Figure 8:
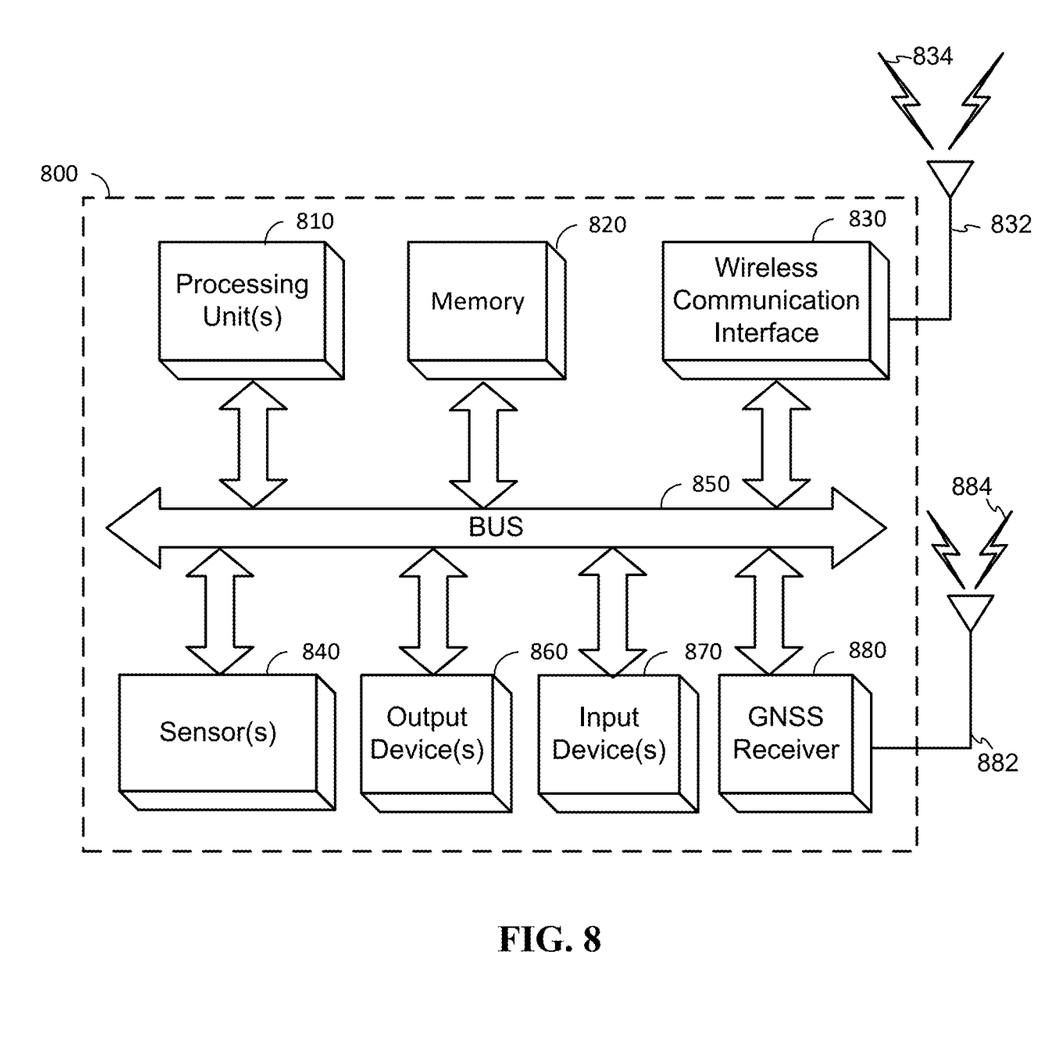
FIG. 8 includes an example of a UE, which may be utilized to implement techniques described herein according to certain embodiments.

FIG. 8 illustrates an example of a UE 800 according to certain embodiments, which may be utilized to implement techniques described herein above. UE 800 may be an example of UE 604 of FIG. 6. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 8.

UE 800 is shown comprising hardware elements that can be electrically coupled via a bus 850 (or may otherwise be in communication, as appropriate). The hardware elements may include one or more processing units 810 which can include without limitation one or more general-purpose processors, one or more special-purpose processors (such as digital signal processor (DSP) chips, graphics acceleration processors, application specific integrated circuits (ASICs), and/or the like), and/or other processing structures or means. In some embodiments, UE 800 may have a separate DSP, depending on desired functionality. Location determination and/or other determinations based on wireless communication may be provided in processing unit(s) 810 and/or wireless communication interface 830 (discussed below). UE 800 also can include one or more input devices 870, which can include without limitation one or more keyboards, touch screens, touch pads, microphones, buttons, dials, switches, and/or the like; and one or more output devices 860, which can include without limitation one or more displays (e.g., touch screens), light emitting diodes (LEDs), speakers, and/or the like.

UE 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable UE 800 to communicate with other devices as described in the embodiments above. As such, wireless communication interface 830 can include RF circuitry (e.g., an RF transceiver) capable of being tuned to transmit and/or receive RF signals (e.g., 3GPP RF signals) as described herein. Wireless communication interface 830 may permit data and signaling to be communicated (e.g., transmitted and received) with Tx/Rx points (TRPs) of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 832 that send and/or receive wireless signals 834. According to some embodiments, wireless communication antenna(s) 832 may comprise a plurality of discrete antennas, antenna arrays, or any combination thereof.

Depending on desired functionality, wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. UE 800 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

UE 800 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of UE 800 may also include a Global Navigation Satellite System (GNSS) receiver 880 capable of receiving signals 884 from one or more GNSS satellites using an antenna 882 (which could be the same as wireless communication antenna 832). Positioning based on GNSS signal measurement can be utilized to complement and/or incorporate the techniques described herein. GNSS receiver 880 can extract a position of UE 800, using conventional techniques, from GNSS satellites of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 810, a DSP, and/or a processing unit within wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 810 or a DSP.

UE 800 may further include and/or be in communication with a memory 820. Memory 820 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

Memory 820 of the UE 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 820 that are executable by UE 800 (and/or processing unit(s) 810 or the DSP within UE 800). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" or "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout the present disclosure discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of the present disclosure, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AA, AC, AAB, AABBCCC, and the like.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method comprising:
obtaining an in-phase/quadrature (I/Q) sample sequence by sampling a center frequency of a radio frequency (RF) segment of an RF band to be searched for cells of a radio access network (RAN), wherein the RF segment is of a bandwidth greater than a channel raster for the RF band, and wherein the center frequency is sampled over each of a series of time intervals to obtain a plurality of I/Q sample sequences including the I/Q sample sequence;
generating a plurality of constituent correlation sequences, including a correlation sequence for the RF segment based on the plurality of constituent correlation sequences, by performing matched filtering of the plurality of I/Q sample sequences with a primary synchronization signal (PSS) sequence;
detecting a RAN cell based on a peak in the correlation sequence; and
identifying an RF channel number associated with the RAN cell.

2. The method of claim 1, wherein the RF channel number is an Evolved Universal Mobile Telecommunications System Terrestrial Radio Access Absolute Radio Frequency Channel Number (EARFCN).

3. The method of claim 1, comprising detecting the RAN cell based on a determination that a value of the peak exceeds a threshold.

4. The method of claim 1, comprising detecting multiple RAN cells based on multiple respective peaks in the correlation sequence.

5. The method of claim 1, comprising generating the correlation sequence for the RF segment by averaging the plurality of constituent correlation sequences.

6. The method of claim 1, comprising determining a physical cell identifier (PCID) of the RAN cell based on the I/Q sample sequence.

7. The method of claim 6, comprising:
processing the I/Q sample sequence to detect a secondary synchronization signal (SSS); and
determining the PCID of the RAN cell based on the SSS.

8. The method of claim 1, comprising measuring, for the detected RAN cell, one or more of:
a reference signal received power (RSRP);
a received signal strength indicator (RSSI); and
a reference signal received quality (RSRQ).

9. A device comprising:
a wireless receiver;
a memory; and
one or more processing units communicatively coupled to the wireless receiver and the memory, and configured to perform operations comprising:
obtaining an in-phase/quadrature (I/Q) sample sequence by sampling a center frequency of a radio frequency (RF) segment of an RF band to be searched for cells of a radio access network (RAN), wherein the RF segment is of a bandwidth greater than a channel raster for the RF band, and wherein the center frequency is sampled over each of a series of time intervals to obtain a plurality of I/Q sample sequences including the I/Q sample sequence;
generating a plurality of constituent correlation sequences, including a correlation sequence for the RF segment based on the plurality of constituent correlation sequences, by performing matched filtering of the plurality of I/Q sample sequence with a primary synchronization signal (PSS) sequence;
detecting a RAN cell based on a peak in the correlation sequence; and
identifying an RF channel number associated with the RAN cell.

10. The device of claim 9, the one or more processing units configured to perform operations comprising detecting the RAN cell based on a determination that a value of the peak exceeds a threshold.

11. The device of claim 9, the one or more processing units configured to perform operations comprising detecting multiple RAN cells based on multiple respective peaks in the correlation sequence.

12. The device of claim 9, the one or more processing units configured to perform operations comprising generating the correlation sequence for the RF segment by averaging the plurality of constituent correlation sequences.

13. The device of claim 9, the one or more processing units configured to perform operations comprising determining a physical cell identifier (PCID) of the RAN cell based on the I/Q sample sequence.

14. The device of claim 13, the one or more processing units configured to perform operations comprising:
processing the I/Q sample sequence to detect a secondary synchronization signal (SSS); and
determining the PCID of the RAN cell based on the SSS.

15. The device of claim 9, the one or more processing units configured to perform operations comprising measuring, for the detected RAN cell, one or more of:
a reference signal received power (RSRP);
a received signal strength indicator (RSSI); and
a reference signal received quality (RSRQ).

16. A non-transitory computer-readable medium having instructions embedded thereon, the instructions, when executed by one or more processing units, causing the one or more processing units to perform operations comprising:
obtaining an in-phase/quadrature (I/Q) sample sequence by sampling a center frequency of a radio frequency (RF) segment of an RF band to be searched for cells of a radio access network (RAN), wherein the RF segment is of a bandwidth greater than a channel raster for the RF band, and wherein the center frequency is sampled over each of a series of time intervals to obtain a plurality of I/Q sample sequences including the I/Q sample sequence;

generating a plurality of constituent correlation sequences, including a correlation sequence for the RF segment based on the plurality of constituent correlation sequences, by performing matched filtering of the plurality of I/Q sample sequences with a primary synchronization signal (PSS) sequence;

detecting a RAN cell based on a peak in the correlation sequence; and identifying an RF channel number associated with the RAN cell.

17. The non-transitory computer-readable medium of claim 16, the instructions, when executed by the one or more processing units, causing the one or more processing units to perform operations comprising detecting the RAN cell based on a determination that a value of the peak exceeds a threshold.

* * * * *